United States Patent [19]

Gou et al.

[11] Patent Number: 5,307,390
[45] Date of Patent: Apr. 26, 1994

[54] CORIUM PROTECTION ASSEMBLY

[75] Inventors: Perng-Fei Gou, Saratoga; Harold E. Townsend, Campbell, both of Calif.; Giancarlo Barbanti, Sirtori, Italy

[73] Assignee: General Electric Company, San Jose, Calif.

[21] Appl. No.: 981,978

[22] Filed: Nov. 25, 1992

[51] Int. Cl.⁵ .............................................. G21C 9/016
[52] U.S. Cl. ......................... 376/280; 976/DIG. 143
[58] Field of Search ............... 376/280; 976/DIG. 143

[56] References Cited

U.S. PATENT DOCUMENTS

| | | | |
|---|---|---|---|
| 3,453,176 | 7/1969 | Edling | 376/280 |
| 3,702,802 | 11/1972 | Jansen, Jr. | 376/280 |
| 4,072,561 | 2/1978 | Friedrich | 376/280 |
| 4,300,983 | 11/1981 | Dalle Donne et al. | 376/280 |
| 5,080,857 | 1/1992 | Miller et al. | 376/280 |

FOREIGN PATENT DOCUMENTS 2236210  3/1991  United Kingdom ................ 376/280

Primary Examiner—Daniel D. Wasil
Attorney, Agent, or Firm—J. S. Beulick

[57] ABSTRACT

A corium protection assembly includes a perforated base grid disposed below a pressure vessel containing a nuclear reactor core and spaced vertically above a containment vessel floor to define a sump therebetween. A plurality of layers of protective blocks are disposed on the grid for protecting the containment vessel floor from the corium.

14 Claims, 3 Drawing Sheets

5,307,390

CORIUM PROTECTION ASSEMBLY

The U.S. Government has rights in this invention in accordance with Department of the Energy Contract No. DE-AC03-90SF18494.

The present invention relates generally to nuclear reactors, and, more specifically, to an assembly for protecting a containment vessel from corium released from the reactor core in the event of an accident.

BACKGROUND OF THE INVENTION

An exemplary nuclear reactor, such as a boiling water reactor (BWR), includes a reactor core disposed in a reactor pressure vessel, with the pressure vessel being in turn disposed in a containment vessel. The reactor core includes a plurality of nuclear fuel rods configured in bundles to generate heat which is transfered to water recirculating therein for generating steam to power a steam turbine generator, for example.

Reactivity in the core is typically controlled by a plurality of control rods typically extending vertically upwardly therein from the bottom of the pressure vessel. Conventional control rod drives (CRDs) are mounted below the pressure vessel in a lower drywell region of the containment vessel for selectively inserting the control rods into the core and withdrawing the control rods therefrom for controlling reactivity. The lower drywell is defined by an annular pedestal which is used to support the pressure vessel and which also supports a rotatable platform below the CRDs for their servicing during a maintenance outage. The pedestal must, therefore, support the substantial weight of the pressure vessel, as well as accurately support the CRD servicing platform for the proper removal and installation of the CRDs during the maintenance outage.

The containment vessel is typically a concrete structure having an inner steel liner designed for containing gas of the expected elevated pressure therein in the event of a nuclear accident, as well as preventing significant nuclear radiation release therefrom.

In the event of a severe accident in which the reactor core melts to form hot, molten core debris known as corium, the corium must be suitably contained within the containment vessel without appreciably damaging the containment vessel or the reactor pedestal. In a conventional design, the lower drywell includes a thick slab of concrete disposed directly on the containment vessel floor which is sized for preventing the corium from breaching the liner of the containment vessel floor. During such an accident, the corium released from the pressure vessel will erode the slab until its heat is dissipated and it solidifies. Accordingly, the slab must be suitably thick to contain the corium until it cools. However, the protective slab, therefore, increases the size of the containment vessel, which in turn increases plant costs.

Furthermore, since the slab is disposed on the liner of the vessel floor, subsequent inspection of the liner is impractical, if not impossible, since the slab would have to be removed for such inspection. And, a suitable sump must still be provided in which any leaking water may accumulate for subsequent removal.

SUMMARY OF THE INVENTION

A corium protection assembly includes a perforated base grid disposed below a pressure vessel containing a nuclear reactor core and spaced vertically above a containment vessel floor to define a sump therebetween. A plurality of layers of protective blocks are disposed on the grid for protecting the containment vessel floor from the corium.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
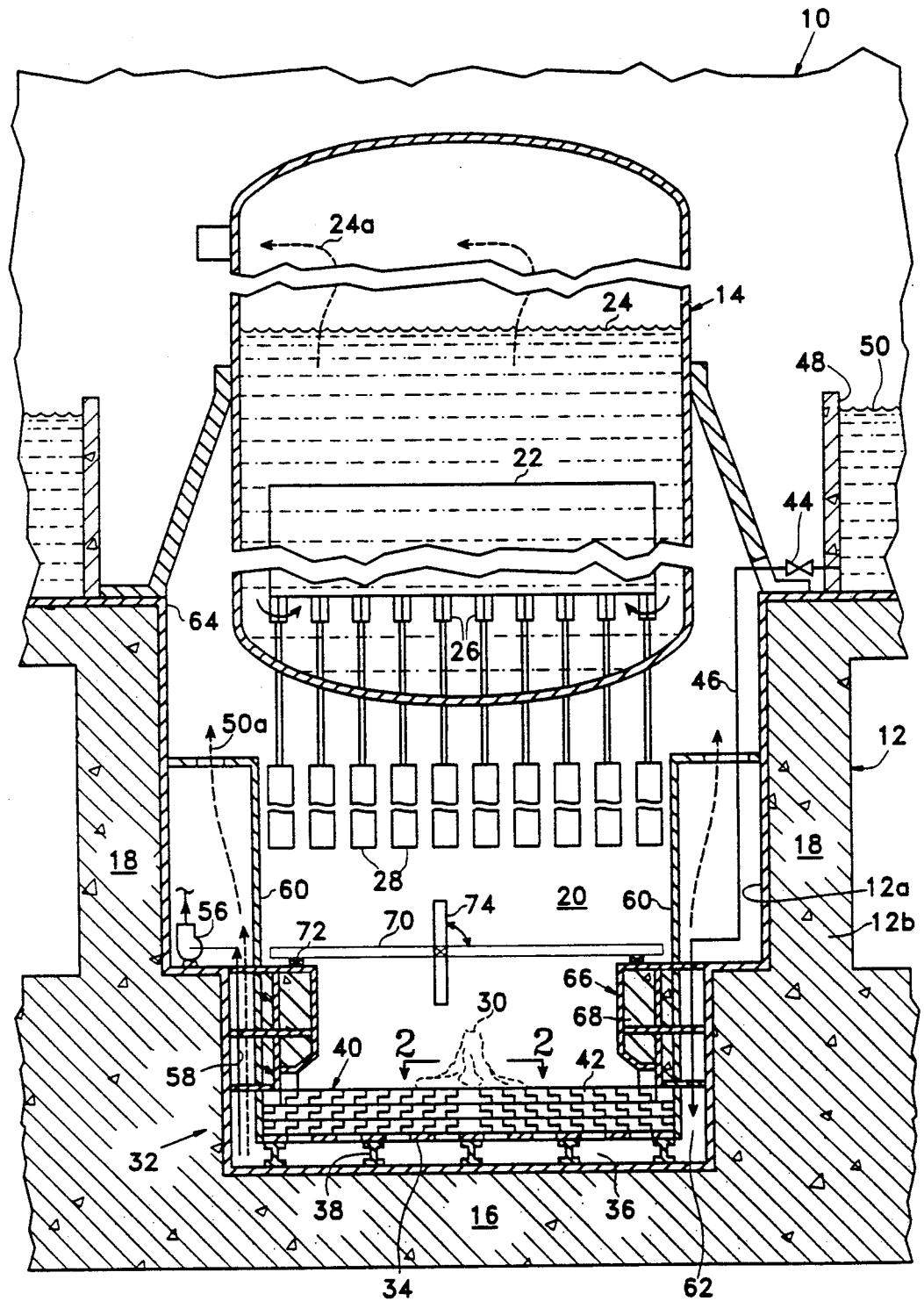
FIG. 1 is a schematic, elevational, partly sectional view of an exemplary nuclear reactor plant including a corium protection assembly in accordance with one embodiment of the present invention.

Illustrated schematically in FIG. 1 is an exemplary nuclear reactor plant 10 including a containment vessel 12 in which is supported a reactor pressure vessel 14. The containment vessel 12 includes a conventional steel liner 12a inside a concrete shell 12b configured in the form of a floor, or base mat, 16 and an annular sidewall 18 extending upwardly therefrom which collectively define a lower drywell 20 disposed below the pressure vessel 14.

The pressure vessel 14 includes a conventional boiling water reactor core 22 having conventional nuclear fuel bundles therein (not shown). The pressure vessel 14 is partially filled with a recirculating coolant (i.e., water) 24 which is heated by the core 22 during operation for generating steam 24a which is suitably channeled from the pressure vessel 14 for providing power to drive a steam turbine-generator, for example (not shown). Reactivity in the core 22 is controlled by a plurality of conventional control rods 26 which are selectively inserted upwardly into the core 22 and withdrawn downwardly from the core 22 by a respective plurality of conventional control rod drives (CRDs) 28. The CRDs 28 extend downwardly below the lower head of the pressure vessel 14 into the lower drywell 20.

In the event of a severe accident in which the reactor core 22 becomes overheated and the nuclear fuel therein, which includes uranium, melts to form a liquid molten mass referred to herein as corium 30, the corium 30 will melt its way through the lower head of the pressure vessel 14 and drop to the bottom of the lower drywell 20 as shown in phantom. In order to protect the containment vessel floor 16 from the corium 30 and contain it therein, a corium protection assembly 32 in accordance with one embodiment of the present invention is provided. The assembly 32 includes a perforated base grid 34 disposed below the pressure vessel 14 in the lower drywell 20 and spaced vertically above the containment vessel floor 16 to define a gap or sump 36 therebetween. The sump 36 may be suitably sized to accommodate inspection of the liner 12a portion of the floor 16, including its welds, either by using a remotely controlled inspection device, or by visual inspection by maintenance personnel.

The base grid 34 may be simply mounted on a plurality of laterally spaced I-beams 38. A plurality of layers 40 of laterally adjoining protective blocks 42 are disposed on the grid 34 and are sized and configured for protecting the containment vessel floor 16 from the corium 30. Instead of a conventional single slab of concrete placed directly on the containment vessel floor 16, the blocks 42 placed on the grid 34 provide more effective corium protection which collectively may be significantly thinner than the single slab, which limits the increase in containment vessel size required therefor. The blocks 42 may be made from conventional concrete including limestone or basaltic aggregates, or may be made from suitable metals or ceramics or combinations thereof for providing suitable heat capacitance for absorbing heat from the corium 30, and suitable ablative properties for reducing erosion thereof by the corium 30 until it may be cooled and solidified.

More specifically, means including a valve 44 and a conduit 46 are provided for selectively flooding the sump 36 with water upon release of the corium 30 from the reactor core 22 for cooling the blocks 42 and the corium 30. The valve 44 is disposed in flow communication by the conduit 46 between the sump 36 and a conventional suppression pool 48 containing water 50 for selectively channeling the water 50 therefrom to flood the sump 36 for quenching or cooling the blocks 42 upon release of the corium 30 from the pressure vessel 14. The suppression pool 48 is disposed inside the containment vessel 12 and is disposed at an elevation above the blocks 42 and in part above the reactor core 22. In the event of a corium release, the valve 44 is suitably opened to allow the water 50 to drain from the suppression pool 48 into the sump 36 wherein it rises upwardly through the grid 34 to cool the blocks 42.

Figure 2:
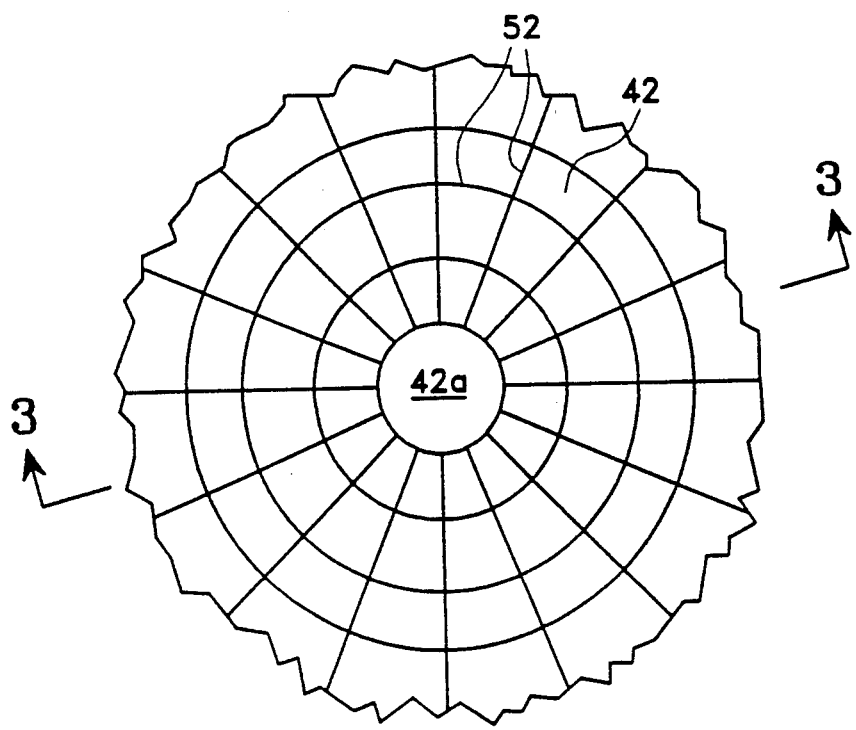
FIG. 2 is a plan view of a portion of protective blocks of the corium protection assembly illustrated in FIG. 1 taken along line 2—2.
Figure 3:
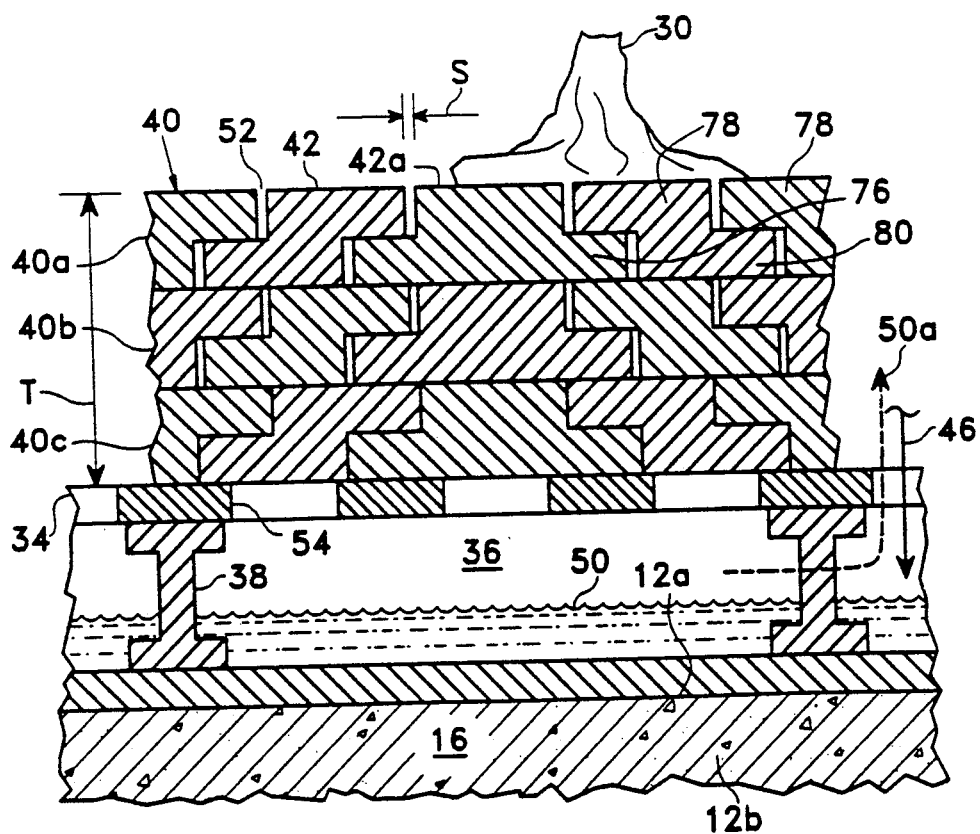
FIG. 3 is an elevational, sectional view of a portion of the corium protection assembly illustrated in FIG. 2 taken along line 3—3.

As shown in FIGS. 2 and 3, adjacent ones of the blocks 42 in each layer 40 define preferably unbonded and unfilled joints 52 therebetween for allowing liquid flow through the layers 40 either from top-to-bottom or from bottom-to-top. For example, during normal operation of the reactor core 22 without release of the corium 30, water may leak from the various pipes, valves, seals, and other typical components within the reactor 10 and then fall by gravity to the bottom of the lower drywell 20. Such leaking water will be allowed to flow between the joints 52 of the blocks 42 and downwardly through the grid 34. The grid 34 includes a plurality of laterally spaced apart apertures 54 which allow the leaking water to flow downwardly into the sump 36 wherein it is collected. A conventional sump pump 56 as shown in FIG. 1 may be disposed in flow communication with the sump 36 by a suitable conduit 58 for removing the leaking water collected therein.

During the severe accident which releases the corium 30 from the reactor core 22, the corium 30 itself will be allowed to flow into the joints 52 and downwardly through at least some of the layers 40. The upper layer blocks 42 may simply rest upon the blocks 42 of underlying layers which will allow either the leaking water or the corium 30 to leak downwardly through the several layers 40. However, the suppression pool water 50 provided in the sump 36 will, in contrast, rise upwardly through the base grid 34 and upwardly through the joints 52 of the several layers 40 for cooling the blocks 42 and the corium 30. The corium 30 will then solidify in the joints 52 and its progression downwardly through the layers 40 will be stopped which will prevent the corium 30 from reaching the liner 12a of the containment vessel floor 16. The water 50 released into the sump 36 will quench the blocks 42 heated by the corium 30 to generate steam 50a which will be released into the sump 36 for flow outwardly therefrom into the lower drywell 20. The lateral size or width of the joints 52, designated S, preferably decreases from a top layer 40a through middle layers 40b and down to a bottom layer 40c of the blocks 42 to provide for some corium flow and to allow thermal expansion of the blocks 42 due to heating by the corium 30. The temperature gradient through the layers 40 decreases from the top layer 40a to the bottom layer 40c with more expansion occurring in the top layer 40a than in the bottom layer 40c. The joints 52 may, therefore, be predeterminedly sized for accommodating the expected thermal expansion and to abut each other at least in the lower layers thereof for preventing the corium 30 from leaking therethrough. However, any corium 30 which does flow into the joints 52 will freeze or solidify in the lower layers upon cooling by the water 50 channeled into the sump 36.

The number of layers 40 and the collective thickness T thereof is selected for each design application. However, the laterally adjoining layers of blocks 42 provided with cooling by the water 50 allows the overall thickness T to be less than the corresponding thickness of a single concrete slab which is not so cooled. The resulting thinner layer of blocks 42 reduces the volume required therefor within the lower drywell 20 and in turn reduces the size requirement for the containment vessel 12 itself, which is an improvement over the conventional thicker, single concrete slab.

Figure 4:
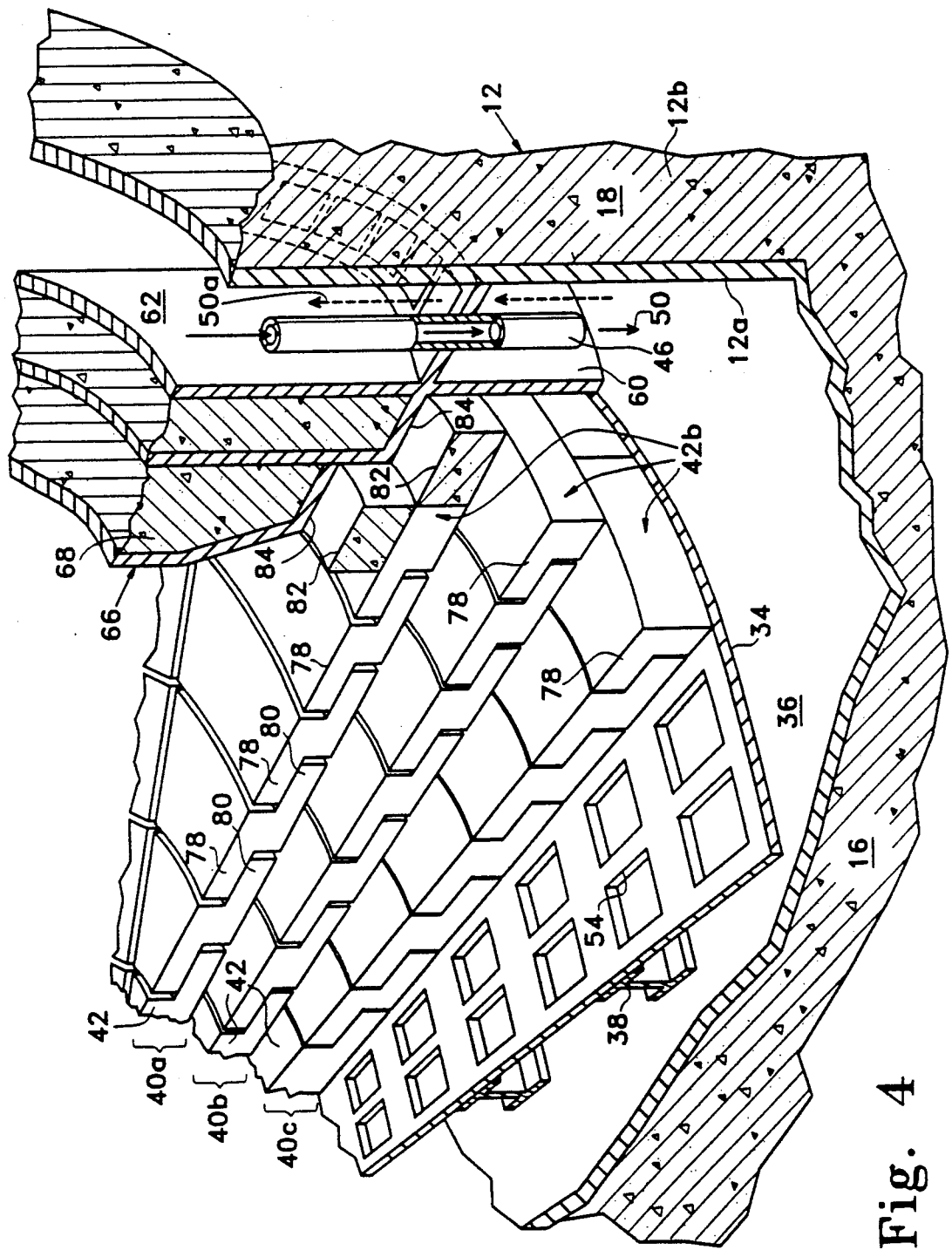
FIG. 4 is a cutaway perspective view of a portion of the corium protection assembly illustrated in FIG. 1 adjacent to an outer perimeter thereof and the containment vessel floor.

Referring to FIGS. 1 and 4, an annular, vertically extending shield wall 60 is spaced radially inwardly from the containment vessel sidewall 18 to define an annular channel 62 therebetween. The shield wall 60 extends vertically above the outer perimeter of the blocks 42 for protecting the liner 12a of the containment vessel side wall 18 from the corium 30 which may splash thereagainst or rise above the top layer 40a of the blocks 42. The shield wall 60 extends suitably upwardly in the drywall 20 as illustrated in FIG. 1 to ensure that the corium 30 will not splash against the liner 12a of the containment vessel sidewall 18 for protecting both the containment vessel liner 12a as well as a pedestal 64 on which the reactor pressure vessel 14 is supported.

The shield wall 60 may be a suitably thick metal cylinder to protect against splashing of the corium 30 and is provided at its bottom with a ring 66 in the form of a structural girder which extends upwardly above the outer perimeter of the blocks 42. The ring girder 66 also extends radially inwardly from the bottom of the sidewall 18 and the shield wall 60 and is suitably supported by the containment vessel sidewall 18. The ring girder 66 is preferably filled with cured concrete 68 for additionally containing the corium 30 against flow toward the containment vessel sidewall 18.

As shown in FIG. 1, the ring girder 66 is fixedly supported by the containment vessel sidewall 18 to provide a stable support for a conventional control rod drive servicing platform 70 mounted thereon. The servicing platform 70 is supported at its outer perimeter on the ring girder 66 by bearings or rollers 72 which allow the platform 70 to rotate as required for servicing the CRDs 28. A conventional servicing carriage 74 is conventionally pivotally mounted on the platform 70 for use in servicing the CRDs 28. Accordingly, the ring girder 66 not only provides additional protection of the containment vessel sidewall 18 from the corium 30 but additionally provides a stable support for the servicing platform 70.

The blocks 42 may have any configuration which allows their assembly and disassembly on the base grid 34. However, where the blocks 42 are formed from concrete, or ceramic, or typical metals used in reactors, they will have a specific weight less than the specific weight of the corium 30 which contains relatively heavy molten uranium. Accordingly, as the corium 30 flows downwardly onto the blocks 42, it will cause unrestrained blocks 42 to float therein. Accordingly, the blocks 42 are configured to interlock laterally with each other in the several layers 40 to prevent unrestrained floating in the corium 30 to maintain the integrity of the layers 40 for preventing the corium 30 from reaching the containment vessel floor 16.

Illustrated in FIGS. 2-4 is one exemplary arrangement for interlocking the blocks 42. As shown in FIGS. 2 and 3, an annular center block 42a is provided for each layer and includes a relatively thin annular bottom flange 76. Each of the blocks 42 is an arcuate segment of a circle, with the blocks 42 adjoining each other circumferentially to form a plurality of circular rows. Each block 42 has, in the vertical direction, a radially inner top flange 78 which rests upon the bottom flange 76 of the center block 42a for the first circular row, and a radially outer bottom flange 80 on which rests the top flange 78 of the next adjacent, radially outer block 42. Each of the blocks 42 extending radially outwardly from the center block 42a therefore has a generally Z-shaped configuration defined by the top and bottom flanges 78, 80 with respective top flanges 78 of a radially outer block 42 resting upon the respective bottom flange 80 of a radially inner block 42 so that each radially succeeding circular row of blocks 42 restrains the blocks 42 radially inwardly therefrom from floating away in the corium 30.

Each succeeding circular row of the blocks 42 therefore retains the preceding row of blocks 42 all the way outwardly to the perimeter of the blocks 42 adjacent to the shield wall 60 and the ring girder 66 as illustrated in FIG. 4. The ring girder 66 is suitably configured to interlock with the perimeter of the blocks 42 to restrain floating of the blocks 42 in the corium 30. As shown in FIG. 4, the blocks designated 42b which form the perimeter of each of the layers 40 are restrained radially and vertically by the ring girder 66. The perimeter blocks 42b in this exemplary embodiment includes a top flange 78 but not a bottom flange 80. The perimeter blocks 42b are therefore not restrained by their bottom flanges 80 as the intermediate blocks 42 are restrained, but instead a retaining block or wedge 82 is disposed on the top of the perimeter block 42b and abuts a complementary step 84 formed in the ring girder 66. In this way, the several layers 40 of the blocks 42 may be assembled by starting with the center block 42a and simply laying the succeeding annular rows of blocks 42 on the respective bottom flanges 80 until the perimeter blocks 42b are installed. Each of the many succeeding layers 40 are similarly assembled, with at least the top layer 40a being retained by the ring girder 66 using the retaining wedges 82. The ring girder 66 retains the perimeter of the top layer 40a and in turn the perimeters of the lower layers 40b and 40c with the Z-shaped blocks 42 retaining in turn the radially inner rows of blocks 42 relative to the ring girder 66. Accordingly, in the event the rows 40 of the blocks 42 tend to float in the corium 30, such floating is restrained by the interlocking between adjacent blocks 42 and the interlocking between the perimeter blocks 42b and the ring girder 66. Furthermore, the blocks 42, 82 may be suitably sized as small or as large as desired for allowing assembly and disassembly thereof as easily as possible.

The corium protection assembly 32 described above therefore provides an improved arrangement which allows effective cooling of the blocks 42 and the corium 30 by the suppression pool water 50 channeled into the sump 36. The resulting steam 50a is allowed to flow upwardly through the channel 62 for release into the containment vessel 12. As many layers 40 of the blocks 42 as are required to contain the corium 30 may be selected for each design application so that even upon ablation of the upper layers either due to wearing, or melting, or vaporization, the intermediate and lower layers remain intact for preventing the corium 30 from reaching the containment vessel floor 16. The sump 36 allows for effective cooling of the blocks 42 by the suppression pool water 50 channeled thereto during the corium release accident, while also providing a collection area for water typically leaking during normal operation of the reactor 10. The sump pump 56 removes such leaking water as desired during normal operation. The sump 36 also allows inspection of the liner 12a during the lifetime of the reactor 10. The liner 12a under the base grid 34 may be inspected by suitable instruments or cameras inserted therein through the channel 62. Or, the blocks 42 may be disassembled during a maintenance outage for allowing access through the grid 34 to inspect the liner 12a thereunder. The blocks 42, the ring girder 66, and the shield wall 60 protect the containment vessel sidewall 18 from corium erosion, which in turn protects the pressure vessel support pedestal 64, with the ring girders 66 providing a stable support for the servicing platform 70. In the preferred embodiment, the blocks 42 are formed of a material which will provide a minimum release of non-condensable gas, or hydrogen, or carbon dioxide upon being heated or vaporized by the corium 30. For example, basaltic over limestone aggregate concrete is preferred to minimize the buildup of pressure within the containment vessel 12 which would otherwise occur due to released carbon dioxide from the limestone aggregate concrete. Since the blocks 42 are merely joined in abutting contact with each other without mortar or other filler in the joints, they may be readily disassembled during a maintenance outage for repair or replacement as required.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. An assembly for protecting a containment vessel from corium releasable from a nuclear reactor core disposed in a reactor pressure vessel installed inside said containment vessel, comprising:

a perforated base grid disposed below said pressure vessel and spaced vertically above a floor of said containment vessel to define a sump therebetween;

a plurality of layers of laterally adjoining protective blocks disposed on said grid, said blocks being sized and configured for protecting said containment vessel floor from said corium; and means for selectively flooding said sump with water upon release of said corium from said reactor core for cooling said blocks and said corium, wherein adjacent ones of said blocks define joints therebetween for allowing liquid flow through said layers and said joints decrease in size from a top layer to a bottom layer of said blocks.

2. An assembly for protecting a containment vessel from corium releasable from a nuclear reactor core disposed in a reactor pressure vessel installed inside said containment vessel, comprising:

a perforated base grid disposed below said pressure vessel and spaced vertically above a floor of said containment vessel to define a sump therebetween;

a plurality of layers of laterally adjoining protective blocks disposed on said grid, said blocks being sized and configured for protecting said containment vessel floor from said corium, adjacent ones of said blocks defining joints therebetween for allowing liquid flow through said layers;

means for selectively flooding said sump with water upon release of said corium from said reactor core for cooling said blocks and said corium;

an annular shield wall spaced radially inwardly from a sidewall of said containment vessel to define an annular channel therebetween, said annular shield extending above a perimeter of said blocks for protecting said containment vessel sidewall from said corium; and a ring girder disposed at a bottom of said shield wall and above said blocks and extending radially inwardly from said shield wall, said ring girder being filled with concrete for containing said corium, wherein said ring girder is fixedly supported by said containment vessel sidewall to provide a stable support for a control rod drive servicing platform mounted thereon.

3. An assembly for protecting a containment vessel from corium releasable from a nuclear reactor core installed in a reactor pressure vessel, which is in turn installed inside said containment vessel, comprising:

a generally planar base grid having a plurality of apertures;

means for supporting said base grid in a generally horizontal position at a predetermined elevation above a floor of said containment vessel; and a first plurality of blocks of solid material arranged to form a first planar layer seated on said base grid, said solid material being resistant to corium erosion, said blocks of said first plurality having unfilled and unbonded joints therebetween, said first plurality of blocks comprising a first group of interlocking blocks arranged along a first line and a second group of interlocking blocks arranged along a second line, said blocks of said first group abutting but not interlocking with said blocks of said second group on one side thereof, wherein said unfilled and unbonded joints allow liquid to enter.

4. The assembly as defined in claim 3, wherein each of said blocks of said first and second groups is an integral block of said solid material having a central section, an overlapping flange extending horizontally from an upper half of said central section, and an underlying flange extending horizontally from a lower half of said central section, said overlapping and underlying flanges being disposed on opposing sides of said central section, said blocks of said first group being arranged such that the overlapping flange of one block sits atop the underlying flange of an adjacent block and said blocks of said second group being arranged such that the overlapping flange of one block sits atop the underlying flange of an adjacent block, thereby forming joints having a profile consisting of a horizontal joint portion between opposing overlapping and underlying flanges, a first vertical joint portion having a lower end in flow communication with one end of said horizontal joint portion, and a second vertical joint portion having an upper end in flow communication with the other end of said horizontal joint portion.

5. The assembly as defined in claim 3, further comprising a second plurality of blocks of said solid material arranged to form a second planar layer seated on said first planar layer, said blocks of said second plurality having unfilled and unbonded joints therebetween, said second plurality of blocks comprising a third group of interlocking blocks arranged along a third line and a fourth group of interlocking blocks arranged along a fourth line, said blocks of said third group abutting but not interlocking with said blocks of said fourth group on one side thereof, wherein said unfilled and unbonded joints between adjacent ones of said third group of blocks and said unfilled and unbonded joints between adjacent ones of said fourth group of blocks are dimensioned such that liquid may enter.

6. The assembly as defined in claim 5, wherein each of said blocks of said first through fourth groups is an integral block of said solid material having a central section, an over-lapping flange extending horizontally from an upper half of said central section, and an underlying flange extending horizontally from a lower half of said central section, said overlapping and underlying flanges being disposed on opposing sides of said central section, the blocks within each of said first through fourth groups being arranged such that the overlapping flange of one block sits atop the underlying flange of an adjacent block, thereby forming joints having a profile consisting of a horizontal joint portion between opposing overlapping and underlying flanges, a first vertical joint portion having a lower end in flow communication with one end of said horizontal joint portion, and a second vertical joint portion having an upper end in flow communication with the other end of said horizontal joint portion.

7. The assembly as defined in claim 5, further comprising a third plurality of blocks of said solid material arranged to form a third planar layer seated on said second planar layer, said blocks of said third plurality having unfilled and unbonded joints therebetween, said third plurality of blocks comprising a fifth group of interlocking blocks arranged along a fifth line and a sixth group of interlocking blocks arranged along a sixth line, said blocks of said fifth group abutting but not interlocking with said blocks of said sixth group on one side thereof, wherein said unfilled and unbonded joints between adjacent ones of said fifth group of blocks and said unfilled and unbonded joints between adjacent ones of said sixth group of blocks are dimensioned such that liquid may enter.

8. The assembly as defined in claim 7, wherein each of said blocks of said first through sixth groups is an integral block of said solid material having a central section, an overlapping flange extending horizontally from an upper half of said central section, and an underlying flange extending horizontally from a lower half of said central section, said overlapping and underlying flanges being disposed on opposing sides of said central section, the blocks within each of said first through sixth groups being arranged such that the overlapping flange of one block sits atop the underlying flange of an adjacent block, thereby forming joints having a profile consisting of a horizontal joint portion between opposing overlapping and underlying flanges, a first vertical joint portion having a lower end in flow communication with one end of said horizontal joint portion, and a second vertical joint portion having an upper end in flow communication with the other end of said horizontal joint portion, and wherein said first and second vertical joint portions of said third and fourth groups of blocks have a first predetermined width, and said first and second vertical joint portions of said fifth and sixth groups of blocks have a second predetermined width, said second predetermined width being greater than said first predetermined width.

9. The assembly as defined in claim 8, wherein said first predetermined width is greater than the amount of thermal expansion in a radial direction of a block in said second planar layer and said second predetermined width is greater than the amount of thermal expansion in a radial direction of a block in said third planar layer.

10. The assembly as defined in claim 3, wherein said first group of blocks forms a first radial segment in said first planar layer and said second group of blocks forms a second radial segment adjacent to said first radial segment.

11. The assembly as defined in claim 5, wherein said first group of blocks forms a first radial segment in said first planar layer and said second group of blocks forms a second radial segment adjacent to said first radial segment, and said third group of blocks forms a first radial segment in said second planar layer and said fourth group of blocks forms a second radial segment adjacent to said third radial segment.

12. The assembly as defined in claim 11, wherein said first and second radial segments of said second planar layer are staggered in an azimuthal direction relative to said first and second radial segments of said first planar layer.

13. The assembly as defined in claim 8, further comprising a cylindrical shield wall which surrounds and extends above said first through third planar layer of blocks, ring girder disposed radially inward of said cylindrical shield wall and above the outer perimeter of said third planar layer of blocks, said ring girder being supported by a sidewall of said containment vessel, and abutment means for retaining said layers of blocks in place, said abutment means comprising blocks wedged between said ring girder and the outermost blocks of said third planar layer.

14. The assembly as defined in claim 3, further comprising means for flooding the space between said base grid and said floor of said containment vessel with water in response to release of corium from said reactor core.

* * * * *